(12) United States Patent
Hong (10) Patent No.: US 11,084,418 B2
(45) Date of Patent: *Aug. 10, 2021

(54) APPARATUS AND METHOD FOR OUTPUTTING PLATOONING INFORMATION IN VEHICLE

(71) Applicants: Hyundai Motor Company, Seoul (KR); Kia Motors Corporation, Seoul (KR)

(72) Inventor: Jeong Ki Hong, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/882,141

(22) Filed: May 22, 2020

(65) Prior Publication Data

US 2020/0324692 A1  Oct. 15, 2020

Related U.S. Application Data

(63) Continuation of application No. 16/538,394, filed on Aug. 12, 2019, now Pat. No. 10,703,262.

(30) Foreign Application Priority Data

Apr. 10, 2019  (KR) .................. 10-2019-0042110

(51) Int. Cl.
*B60Q 1/54* (2006.01)
*H04W 4/46* (2018.01)
*G05D 1/02* (2020.01)

(52) U.S. Cl.
CPC ............. *B60Q 1/54* (2013.01); *G05D 1/0287* (2013.01); *H04W 4/46* (2018.02); *G05D 2201/0213* (2013.01)

(58) Field of Classification Search
None
See application file for complete search history.

(56) References Cited

U.S. PATENT DOCUMENTS

| 5,777,451 A | 7/1998 | Kobayashi et al. |
| 5,781,119 A | 7/1998 | Yamashita et al. |

(Continued)

FOREIGN PATENT DOCUMENTS

JP  6126379 B2  5/2017

*Primary Examiner* — Curtis J King (74) *Attorney, Agent, or Firm* — Mintz Levin Cohn Ferris Glovsky and Popeo, P.C.; Peter F. Corless (57) ABSTRACT

An apparatus for outputting platooning information by a platooning vehicle in a platooning group may include: one or more lamps configured to project light onto a road; a communication circuit; a controller configured to control a platooning operation of the vehicle; and a control circuit electrically connected with the one or more lamps, the communication circuit, and the controller. The control circuit may be configured to: control the one or more lamps so as to output on the road a distance range between the platooning vehicle and an outside vehicle that is not part of the platooning group when a request from the outside vehicle to join the platooning group is approved by the platooning vehicle or a leading vehicle of the platooning group. The distance range may be a distance required to join the platooning group.

8 Claims, 9 Drawing Sheets

(56) References Cited

U.S. PATENT DOCUMENTS

| | | | |
|---|---|---|---|
| 6,032,097 A * | 2/2000 | Iihoshi | G05D 1/0293 701/96 |
| 6,733,134 B2 * | 5/2004 | Bleiner | B60Q 1/52 353/13 |
| 6,967,593 B2 | 11/2005 | Carroll | |
| 7,175,321 B1 * | 2/2007 | Lopez | B60Q 1/50 296/21 |
| 7,375,621 B1 * | 5/2008 | Hines | B60Q 9/005 340/435 |
| 9,037,389 B2 | 5/2015 | You | |
| 9,141,112 B1 | 9/2015 | Loo et al. | |
| 9,396,661 B2 * | 7/2016 | Okamoto | G05D 1/0293 |
| 9,494,944 B2 * | 11/2016 | Alam | G08G 1/16 |
| 9,533,685 B2 * | 1/2017 | Ask | B60W 30/18163 |
| 9,632,507 B1 * | 4/2017 | Korn | G05D 1/0295 |
| 2005/0117364 A1 | 6/2005 | Rennick et al. | |
| 2006/0225329 A1 | 10/2006 | Morrow | |
| 2007/0053195 A1 | 3/2007 | Alberti | |
| 2009/0299552 A1 | 12/2009 | Villaume et al. | |
| 2010/0017111 A1 * | 1/2010 | Stefani | G01C 15/00 701/533 |
| 2010/0283590 A1 * | 11/2010 | Tee | B62J 6/04 340/432 |
| 2012/0044090 A1 * | 2/2012 | Kahler | B60Q 1/50 340/905 |
| 2012/0086582 A1 * | 4/2012 | Durekovic | G08G 1/164 340/903 |
| 2012/0194356 A1 * | 8/2012 | Haines | B60Q 1/323 340/933 |
| 2013/0211624 A1 | 8/2013 | Lind et al. | |
| 2014/0100734 A1 * | 4/2014 | Yamashiro | G08G 1/22 701/23 |
| 2014/0107867 A1 * | 4/2014 | Yamashiro | G05D 1/0293 701/2 |
| 2014/0300464 A1 * | 10/2014 | Chen | B60Q 1/24 340/471 |
| 2014/0316865 A1 | 10/2014 | Okamoto | |
| 2015/0203023 A1 * | 7/2015 | Marti | B60Q 1/503 340/425.5 |
| 2015/0353094 A1 | 12/2015 | Harda et al. | |
| 2016/0019782 A1 | 1/2016 | Alam et al. | |
| 2016/0026187 A1 | 1/2016 | Alam et al. | |
| 2016/0054735 A1 | 2/2016 | Switkes et al. | |
| 2016/0121893 A1 | 5/2016 | Ask | |
| 2016/0217687 A1 * | 7/2016 | Rous | B60Q 1/50 |
| 2016/0231746 A1 * | 8/2016 | Hazelton | B60W 30/00 |
| 2016/0297447 A1 | 10/2016 | Suzuki | |
| 2017/0011633 A1 * | 1/2017 | Boegel | B60W 30/18163 |
| 2017/0120798 A1 * | 5/2017 | Kiriyama | G07C 9/00698 |
| 2017/0186327 A1 | 6/2017 | Uysal et al. | |
| 2017/0210282 A1 * | 7/2017 | Rodriguez Barros | B60Q 1/484 |
| 2017/0227972 A1 | 8/2017 | Sabau | |
| 2017/0240096 A1 * | 8/2017 | Ross | G08G 1/0955 |
| 2017/0240098 A1 * | 8/2017 | Sweeney | B60Q 1/50 |
| 2017/0253177 A1 * | 9/2017 | Kawamata | B60Q 9/008 |
| 2017/0267167 A1 * | 9/2017 | Sakata | B60Q 1/38 |
| 2017/0308090 A1 | 10/2017 | Asakura | |
| 2017/0329348 A1 | 11/2017 | Li et al. | |
| 2017/0344023 A1 * | 11/2017 | Laubinger | B60W 50/14 |
| 2017/0361762 A1 * | 12/2017 | Wunsche, III | B60T 7/22 |
| 2017/0361767 A1 * | 12/2017 | Arceo | B60Q 1/525 |
| 2018/0005460 A1 | 1/2018 | Alieiev et al. | |
| 2018/0018605 A1 * | 1/2018 | Light-Holets | G06Q 20/405 |
| 2018/0025634 A1 * | 1/2018 | Ujiie | G08G 1/0125 701/119 |
| 2018/0082591 A1 * | 3/2018 | Pandy | B60W 10/18 |
| 2018/0086254 A1 * | 3/2018 | Morel | B60Q 1/143 |
| 2018/0093606 A1 * | 4/2018 | Terwilliger | B60Q 1/525 |
| 2018/0120861 A1 * | 5/2018 | Saxena | G05D 1/0291 |
| 2018/0137763 A1 * | 5/2018 | Derag Rden | B60W 30/165 |
| 2018/0154895 A1 * | 6/2018 | Chae | B60W 10/20 |
| 2018/0174450 A1 * | 6/2018 | Im | G08G 1/0112 |
| 2018/0176750 A1 | 6/2018 | Xu et al. | |
| 2018/0181359 A1 * | 6/2018 | Monroe | G06F 3/0488 |
| 2018/0186283 A1 * | 7/2018 | Fischer | G07C 5/008 |
| 2018/0188746 A1 * | 7/2018 | Lesher | G08G 1/20 |
| 2018/0190128 A1 | 7/2018 | Saigusa | |
| 2018/0237012 A1 | 8/2018 | Jammoussi et al. | |
| 2018/0237156 A1 * | 8/2018 | Ross | G01C 21/365 |
| 2018/0273040 A1 * | 9/2018 | Arndt | B60W 10/20 |
| 2018/0348791 A1 | 12/2018 | Hendrickson et al. | |
| 2019/0001818 A1 * | 1/2019 | Sakata | B60Q 1/503 |
| 2019/0016255 A1 * | 1/2019 | Damon | B60Q 1/24 |
| 2019/0100198 A1 * | 4/2019 | Hakki | B60Q 9/008 |
| 2019/0101933 A1 | 4/2019 | Dudar | |
| 2019/0152392 A1 * | 5/2019 | DePaschoal | H04N 13/239 |
| 2019/0215671 A1 * | 7/2019 | Takii | H04L 51/38 |
| 2019/0329708 A1 * | 10/2019 | Hakki | B60Q 1/50 |
| 2019/0349719 A1 * | 11/2019 | Pattan | H04W 4/40 |
| 2019/0385461 A1 * | 12/2019 | Blomstrand | G08G 1/22 |
| 2020/0057453 A1 * | 2/2020 | Laws | B60W 10/20 |
| 2020/0193837 A1 * | 6/2020 | Grolle | B60Q 1/50 |
| 2020/0298882 A1 * | 9/2020 | Kobayashi | B60W 60/0025 |
| 2020/0301444 A1 * | 9/2020 | Sujan | G05D 1/0293 |

* cited by examiner

APPARATUS AND METHOD FOR OUTPUTTING PLATOONING INFORMATION IN VEHICLE

CROSS-REFERENCE TO RELATED APPLICATION

This application is a continuation of U.S. application Ser. No. 16/538,394, filed Aug. 12,2019, which claims the benefit of priority to Korean Patent Application No. 10-2019-0042110, filed in the Korean Intellectual Property Office on Apr. 10, 2019, the entire contents of which are incorporated herein by reference.

TECHNICAL FIELD

The present disclosure relates to an apparatus and method for outputting information associated with platooning by a vehicle.

BACKGROUND

Platooning involves a plurality of vehicles performing autonomous driving in which the vehicles are arranged at a specified interval in line. While the vehicles perform the platooning, a leading vehicle located in front of the platooning line may control one or more following vehicles which follow the leading vehicle. The leading vehicle may maintain an interval between the plurality of vehicles in the platooning line and may exchange information characterizing behaviors and situations of the vehicles in the platooning line using vehicle-to-vehicle (V2V) communication.

It may also necessary for a vehicle in the platooning group to display platooning information associated with the platooning. Meanwhile, a driver of an outside vehicle not part of the platooning group may drive with reference to the displayed information.

However, there are no insufficient means and methods by which a platooning vehicle may be able to effectively display platooning information. Thus, there is a need to develop means and methods for displaying platooning information to an outside vehicle.

SUMMARY

The present disclosure has been made to solve the above-mentioned problems occurring in the related art while advantages achieved by the related art are maintained intact.

An aspect of the present disclosure provides an apparatus and method for a platooning vehicle to output a variety of information on a road using a light device to enhance the reliability of a platooning system and intuitively output platooning information to other drivers.

The technical problems to be solved by the present inventive concept are not limited to the aforementioned problems, and any other technical problems not mentioned herein will be clearly understood from the following description by those skilled in the art to which the present disclosure pertains.

According to embodiments of the present disclosure, an apparatus for outputting platooning information by a platooning vehicle in a platooning group may include: one or more lamps configured to project light onto a road; a communication circuit; a controller configured to control a platooning operation of the vehicle; and a control circuit electrically connected with the one or more lamps, the communication circuit, and the controller. The control circuit may be configured to: control the one or more lamps so as to output on the road a distance range between the platooning vehicle and an outside vehicle that is not part of the platooning group when a request from the outside vehicle to join the platooning group is approved by the platooning vehicle or a leading vehicle of the platooning group. The distance range may be a distance required to join the platooning group.

The control circuit may adjust the distance range based on a speed of the platooning vehicle.

The control circuit may control the one or more lamps so as to output symbols on the road surrounding the platooning group to identify the platooning group.

The control circuit may output symbols surrounding a front and sides of the vehicle when the platooning vehicle is the leading vehicle; output symbols surrounding a rear and the sides of the vehicle when the platooning vehicle is a tail-end vehicle of the platooning group; and output symbols surrounding the sides of the vehicle when the platooning vehicle is located in a middle of the platooning group.

The control circuit may control the one or more lamps so as to output symbols surrounding the platooning vehicle to identify the leading vehicle when the platooning vehicle is the leading vehicle of the platooning group.

The control circuit may control the one or more lamps so as to output symbols surrounding the platooning vehicle on the road in a color different from a color of a symbol output from another vehicle in the platooning group.

The apparatus may further include a sensor that senses illumination intensity. The control circuit may adjust a brightness of the one or more lamps based on an external illumination intensity sensed by the sensor.

The control circuit may adjust a brightness of the one or more lamps based on lane detection reliability of another vehicle in the platooning group.

The control circuit may receive, via the communication circuit, a request from another outside vehicle to enter into the platooning group in front of or behind the platooning vehicle; and control the one or more lamps so as to output a symbol on the road for guiding the other outside vehicle to enter the platooning group.

Furthermore, according to embodiments of the present disclosure, a method for outputting platooning information by a platooning vehicle in a platooning group may include: determining, by a control circuit of the platooning vehicle, whether a request from an outside vehicle that is not part of the platooning group to join the platooning group is approved by the platooning vehicle or a leading vehicle of the platooning group; and controlling, by the control circuit, one or more lamps of the platooning vehicle so as to output a distance range between the platooning vehicle and the outside vehicle when the request is approved, wherein the distance range is a distance required to join the platooning group.

The method may further include adjusting, by the control circuit, the distance range based on a speed of the platooning vehicle.

The method may further include controlling, by the control circuit, the one or more lamps of the platooning vehicle so as to output symbols on the road surrounding the platooning group to identify the platooning group.

The method may further include controlling, by the control circuit, the one or more lamps of the platooning vehicle so as to output symbols on the road surrounding the platooning vehicle to identify the leading vehicle when the vehicle is the leading vehicle.

The method may further include adjusting, by the control circuit, a brightness of the one or more lamps based on lane detection reliability of another vehicle in the platooning group.

The method may further include receiving, by the control circuit, a request to enter into the platooning group in front of or behind the platooning vehicle from another outside vehicle; and controlling, by the control circuit, one or more lamps of the platooning vehicle so as to output a symbol on the road for guiding the other outside vehicle to enter the platooning group.

BRIEF DESCRIPTION OF THE DRAWINGS

The above and other objects, features and advantages of the present disclosure will be more apparent from the following detailed description taken in conjunction with the accompanying drawings.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be circuit by at least one control circuit. The term "control circuit" may refer to a hardware device that includes a memory and a processor. The memory is configured to store program instructions, and the processor is specifically programmed to execute the program instructions to perform one or more processes which are described further below. The control circuit may control operation of units, modules, parts, devices, or the like, as described herein. Moreover, it is understood that the below methods may be executed by an apparatus comprising the control circuit in conjunction with one or more other components, as would be appreciated by a person of ordinary skill in the art.

Figure 1:
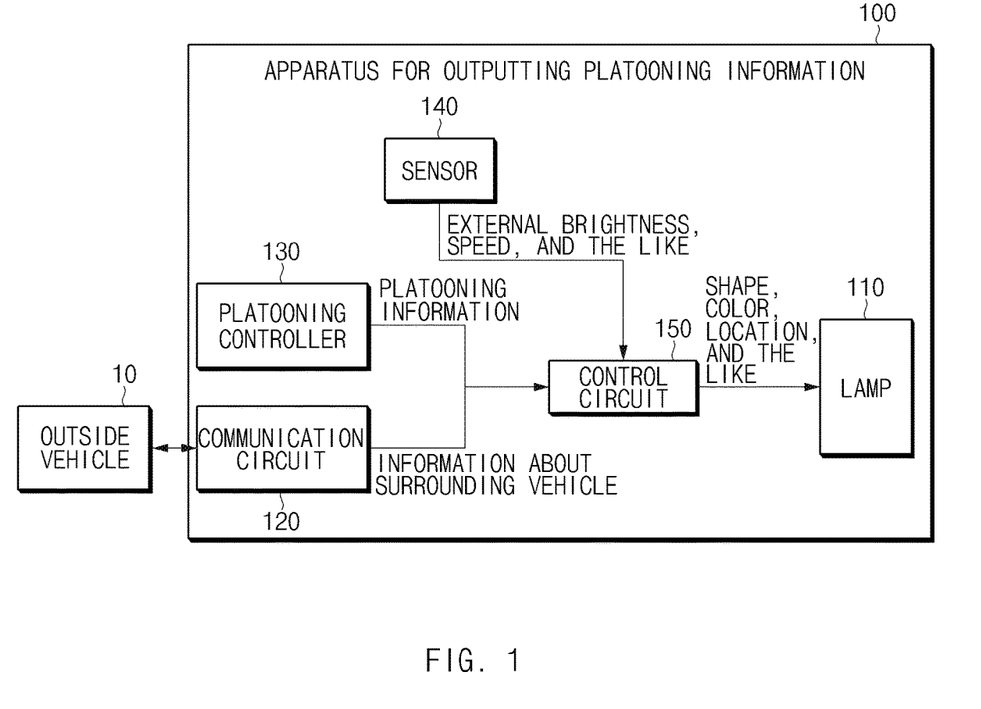
FIG. 1 is a block diagram illustrating a configuration of an apparatus for outputting platooning information by a vehicle according to embodiments of the present disclosure.

Referring now to the presently disclosed embodiments, FIG. 1 is a block diagram illustrating a configuration of an apparatus for outputting platooning information by a vehicle (i.e., "platooning vehicle") in a platooning group according to embodiments of the present disclosure.

As shown in FIG. 1, an apparatus 100 for outputting platooning information according to embodiments may include a lamp 110, or a plurality of lamps 110, a communication circuit 120, a platooning controller 130, a sensor 140, and a control circuit 150. The apparatus 100 for outputting the platooning information may be loaded into the vehicle which supports platooning.

The lamp 110 may be configured to project light onto a road. The lamp 110 may be installed to be toward the road. For example, the lamp 110 may be installed to output light to the front, side, and rear of the vehicle. In the embodiments of FIG. 1, the apparatus 100 for outputting the platooning information includes the one lamp 110. However, embodiments are not limited thereto. For example, the apparatus 100 for outputting the platooning information may include a plurality of lamps.

The communication circuit 120 may be configured to communicate with other vehicles. For example, the communication circuit 120 may communicate with an outside vehicle 10 that is not part of the platooning group with the platooning vehicle and may receive information characterizing the outside vehicle 10. The information characterizing the outside vehicle 10 may be transmitted to the control circuit 150.

The platooning controller 130 may be configured to control an operation of the vehicle for platooning. The platooning controller 130 may have information associated with platooning and may provide the information associated with the platooning to the control circuit 150.

The sensor 140 may sense external illumination intensity, a speed of the vehicle or the outside vehicle 10, and the like. The sensor 140 may provide the sensed information to the control circuit 150.

The control circuit 150 may be electrically connected with the lamp 110, the communication circuit 120, the platooning controller 130, and the sensor 140. The control circuit 150 may control the lamp 110, the communication circuit 120, the platooning controller 130, and the sensor 140 and may perform a variety of data processing and various arithmetic operations. The control circuit 150 may be, for example, an electronic control unit (ECU), a micro controller unit (MCU), or a sub-controller, which is loaded into the vehicle. The control circuit 150 may determine a shape, a color, a location, and the like of a visual indication to be output through the lamp 110, based on information obtained from the communication circuit 120, the platooning controller 130, the sensor 140, and the like and may output the determined visual indication using the lamp 110.

When a request to join a platooning group, generated from the outside vehicle 10, is approved by the vehicle or a leading vehicle of the platooning group, the control circuit 150 may display a distance range between the vehicle and the outside vehicle 10, which is a distance required to join the platooning group, on the road using the lamp 110. For example, when the joining request of the outside vehicle 10 is approved, the control circuit 150 may display a distance (e.g., 20 m behind the vehicle), in which a driver of the outside vehicle 10 should approach the platooning group to join the platooning group, on the road. The distance range may be adjusted based on, for example, a speed of the vehicle. Information characterizing whether to approve the joining request may be obtained from the platooning controller 130. A description will be given in detail with reference to FIG. 2.

The control circuit 150 may output symbols which surround the platooning group to identify the platooning group on the road using the lamp 110. For example, when the vehicle is a leading vehicle of the platooning group, the control circuit 150 may output symbols which surrounds the front and sides of the vehicle. When the vehicle is a tail-end vehicle of the platooning group, the control circuit 150 may output symbols which surround the rear and sides of the vehicle. When the vehicle is a vehicle located in the middle of the platooning group, the control circuit 150 may output symbols which surround the sides of the vehicle. The information characterizing the platooning group may be obtained from the platooning controller 130. A description will be given in detail with reference to FIG. 3.

When the vehicle is the leading vehicle of the platooning group, the control circuit 150 may output symbols which surround the vehicle to identify the leading vehicle on the road using the lamp 110. For example, the control circuit 150 may output symbols which surround the vehicle on the road in a color different from a color of a symbol output from another vehicle included in the platooning group. Information characterizing the platooning group may be obtained from the platooning controller 130. A description will be given in detail with reference to FIG. 4.

The control circuit 150 may adjust brightness of the lamp 110 based on external illumination intensity sensed by the sensor 140. For example, when the environment is bright, the control circuit 150 may increase brightness of the lamp 110. A description will be given in detail of an exemplary embodiment thereof with reference to FIG. 5.

The control circuit 150 may adjust brightness of the lamp 110 based on lane detection reliability of another vehicle included in the platooning group. For example, when lane detection reliability of another platooning vehicle is low, the control circuit 150 may increase brightness of the lamp 110 which projects light onto the periphery of a lane. A description will be given in detail of an exemplary embodiment thereof with reference to FIG. 6.

The control circuit 150 may receive a request to enter in front of or behind the vehicle from another outside vehicle using the communication circuit 120 and may output a symbol to guide the other outside vehicle to enter on the road. For example, the control circuit 150 may output a symbol to guide to enter such that the driver of the outside vehicle 10 knows that the platooning group recognizes the outside vehicle 10. A description will be given in detail of embodiments thereof with reference to FIG. 7.

Figure 2:
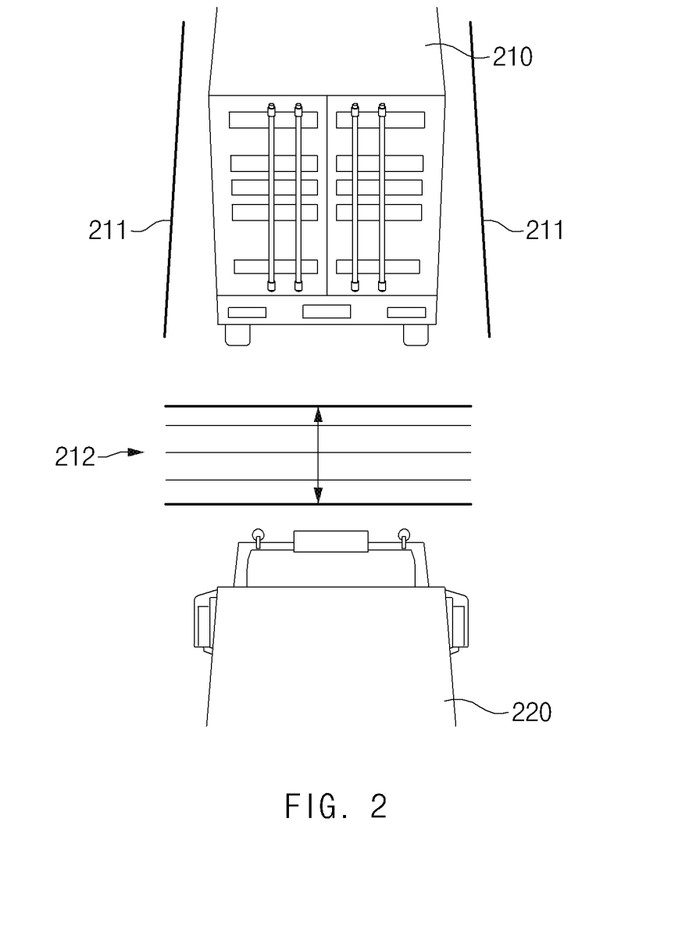
FIG. 2 is a drawing illustrating an exemplary operation of an apparatus for outputting platooning information by a vehicle according to embodiments of the present disclosure.

FIG. 2 is a drawing illustrating an exemplary operation of an apparatus for outputting platooning information by a vehicle according to embodiments of the present disclosure.

As shown in FIG. 2, a vehicle 210 according to embodiments may display a plurality of symbols 211 and 212 on a road using its lamp. For example, the vehicle 210 may output a side indication 211 on the road using lamps respectively installed at the left and right of the vehicle 210. For another example, the vehicle 210 may output the rear indication 212 on the road using a lamp installed at the rear of the vehicle 210. The vehicle 210 may provide the rear indication 212 as visual information for a vehicle to join a platooning group.

An outside vehicle 220 may transmit a request to join the platooning group to the vehicle 210. The vehicle 210 may approve the joining request (when the vehicle 210 is a leading vehicle). The vehicle 210 may determine whether there is approval by a leading vehicle (when the vehicle 210 is a following vehicle). When the joining request is approved, a driver of the outside vehicle 220 should approach the vehicle 210 within a predetermined distance from the vehicle 210 to join the platooning group. The distance may be set based on a speed of the vehicle 210. The vehicle 210 may display a distance in which the outside vehicle 220 should approach the vehicle 210, using the rear indication 212. The driver of the outside vehicle 220 may see the rear indication 212 and may drive the outside vehicle 220 to approach the vehicle 210 closer to the rear indication 212 to join the platooning group. As a result, the driver of the vehicle which join the platooning group may intuitively identify a distance required to join the platooning group and may easily join the platooning group.

Figure 3:
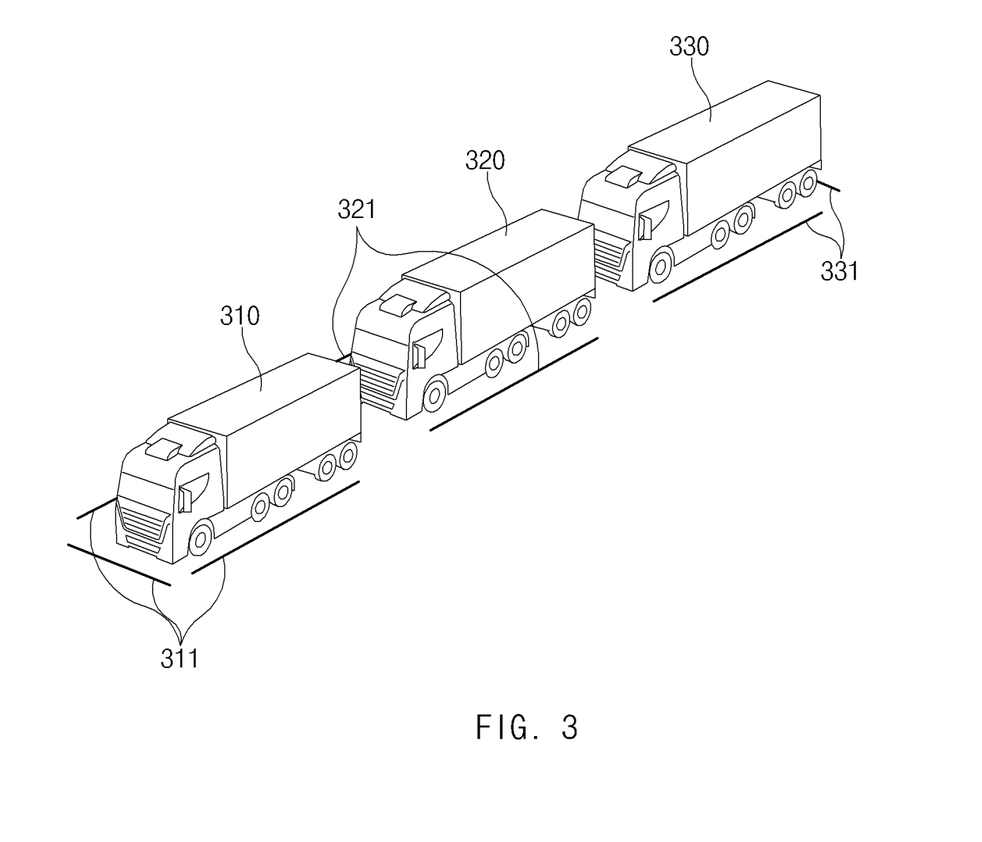
FIG. 3 is a drawing illustrating an exemplary operation of an apparatus for outputting platooning information by a vehicle according to embodiments of the present disclosure.

FIG. 3 is a drawing illustrating an exemplary operation of an apparatus for outputting platooning information by a vehicle according to embodiments of the present disclosure.

As shown in FIG. 3, a leading vehicle 310, a following vehicle 320, and a second following vehicle 330 may display symbols 311, 321, and 331, respectively, using their lamps. The leading vehicle 310, the following vehicle 320, and the second following vehicle 330 may form one platoon group. The leading vehicle 310, the following vehicle 320, and the second following vehicle 330 may display the symbols 311, 321, and 331 to surround the platooning group.

For example, the leading vehicle 310 may display the symbols 311 on the front and sides of the leading vehicle 310. The first following vehicle 320 may display the symbols 321 on the sides of the first following vehicle 320. The second following vehicle 330 located at the tail-end of the platooning group may display the symbols 331 on the sides and rear of the second following vehicle 330. As a result, the symbols 311, 321, and 331 capable of identifying the platooning group may be provided. A driver of an outside vehicle may easily recognize that the leading vehicle 310, the following vehicle 320, and the second following vehicle 330 forms the one platooning group.

Figure 4:
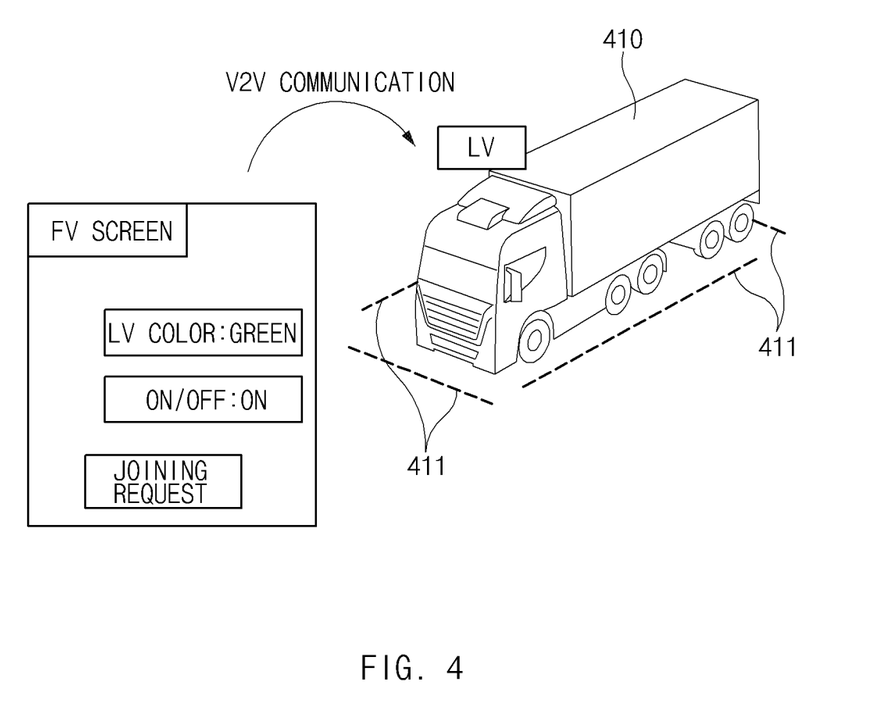
FIG. 4 is a drawing illustrating an exemplary operation of an apparatus for outputting platooning information by a vehicle according to embodiments of the present disclosure.

FIG. 4 is a drawing illustrating an exemplary operation of an apparatus for outputting platooning information by a vehicle according to embodiments of the present disclosure.

As shown in FIG. 4, a vehicle 410 according to an embodiment may display symbols 411 on a road using its lamp. The vehicle may be a leading vehicle. An outside vehicle to join a platooning group including the vehicle 410 may request the vehicle 410 to join the platooning group and to output green symbols which are turned on/off, through V2V communication.

The vehicle 410 may output green symbols 411, which are turned on/off, depending on the request of the outside vehicle. The vehicle 410 may output the symbols 411 to surround the vehicle 410. As a result, the driver of the outside vehicle may identify the leading vehicle of the platooning group the outside vehicle will join. The outside vehicle may set colors, shapes, and the like of the symbols 411 in various manners.

Figure 5:
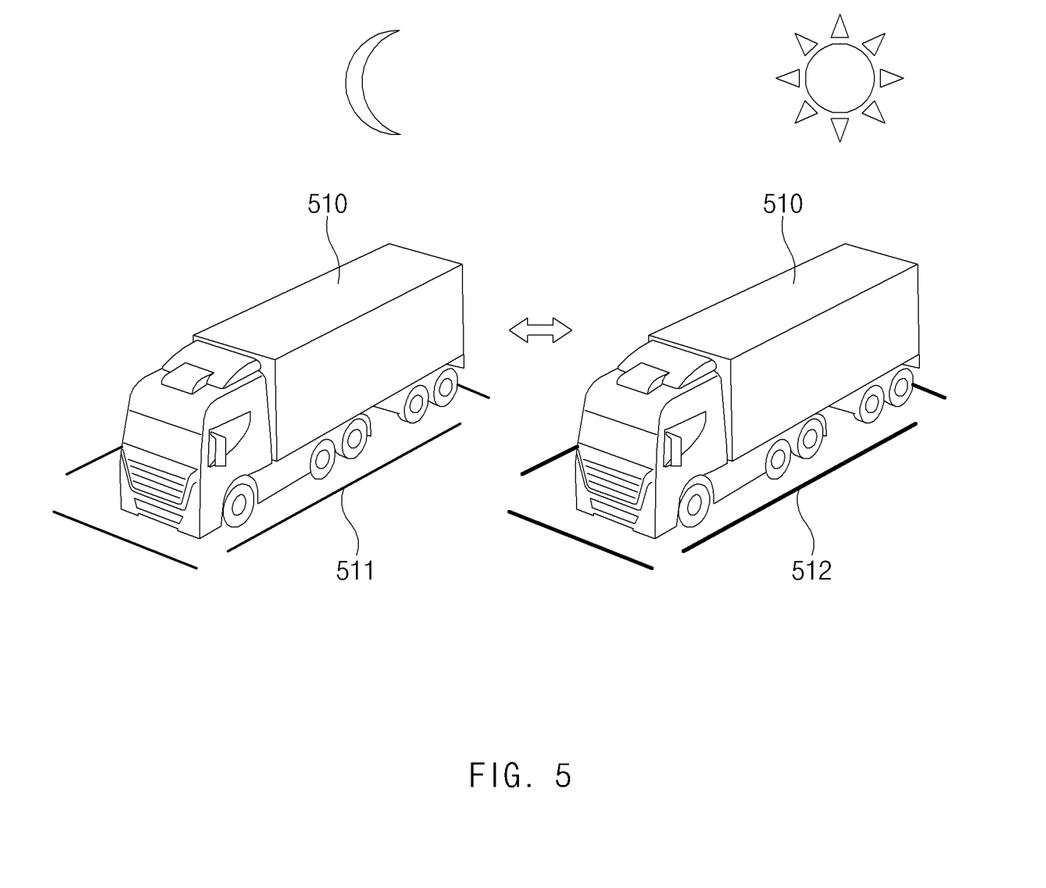
FIG. 5 is a drawing illustrating an exemplary operation of an apparatus for outputting platooning information by a vehicle according to embodiments of the present disclosure.

FIG. 5 is a drawing illustrating an exemplary operation of an apparatus for outputting platooning information by a vehicle according to embodiments of the present disclosure.

As shown in FIG. 5, a vehicle 510 according to embodiments may display symbols 511 or 512 which surround the vehicle 510 on a road. The vehicle 510 may verify external illumination intensity using its illumination sensor. When the external illumination intensity is low, the vehicle 510 may display the relatively dark symbols 511 on the road. When the external illumination intensity is high, the vehicle 510 may display the relative bright symbols 512 on the road. When the external illumination intensity is low, operating the lamp to be bright may interfere with a driver of an outside vehicle and may unnecessarily reduce the life of the lamp. When the external illumination intensity is high, operating the lamp to be dark may make the driver of the outside vehicle difficult to recognize the vehicle 510. To solve the above-mentioned problems, the vehicle 510 may adjust brightness of the symbols based on the external illumination intensity.

Figure 6:
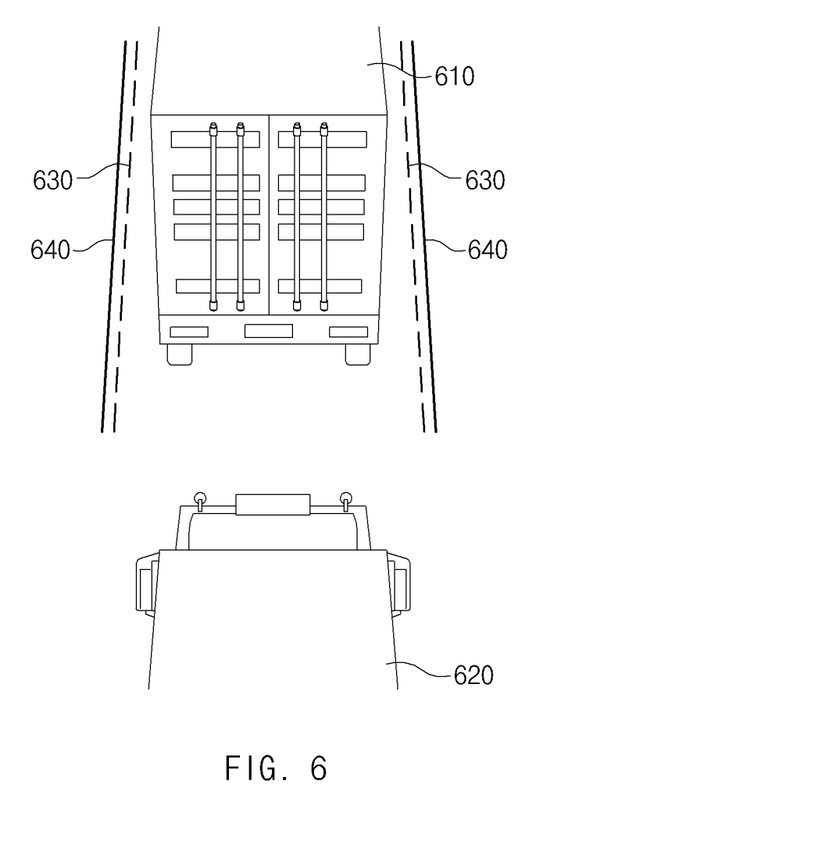
FIG. 6 is a drawing illustrating an exemplary operation of an apparatus for outputting platooning information by a vehicle according to embodiments of the present disclosure.

FIG. 6 is a drawing illustrating an exemplary operation of an apparatus for outputting platooning information by a vehicle according to embodiments of the present disclosure.

As shown in FIG. 6, a first vehicle 610 according to embodiments may output symbols 640 on the sides of the first vehicle 610. The symbols 640 may be displayed on locations close to lanes 630. The second vehicle 620 may form a platooning group with the first vehicle 610 and may follow the first vehicle 610. The first vehicle 610 and the second vehicle 620 may detect the lanes 630 and may perform lane keeping control for the lanes 630.

The first vehicle 610 may obtain information characterizing lane detection reliability for the lanes 630 in the second vehicle 620 from the second vehicle 620. Because a distance between the first vehicle 610 and the second vehicle 620 is very short when platooning is performed, the lane detection reliability for the lanes 630 in the second vehicle 620 may be low. When the lane detection reliability for the lanes 630 in the second vehicle 620 is low, the first vehicle 610 may increase brightness of the symbols 640. In this case, the second vehicle 620 may perform lane detection for the lanes 630 using the symbols 640. The lane detection reliability for the lanes 630 in the second vehicle 620 may be increased.

Figure 7:
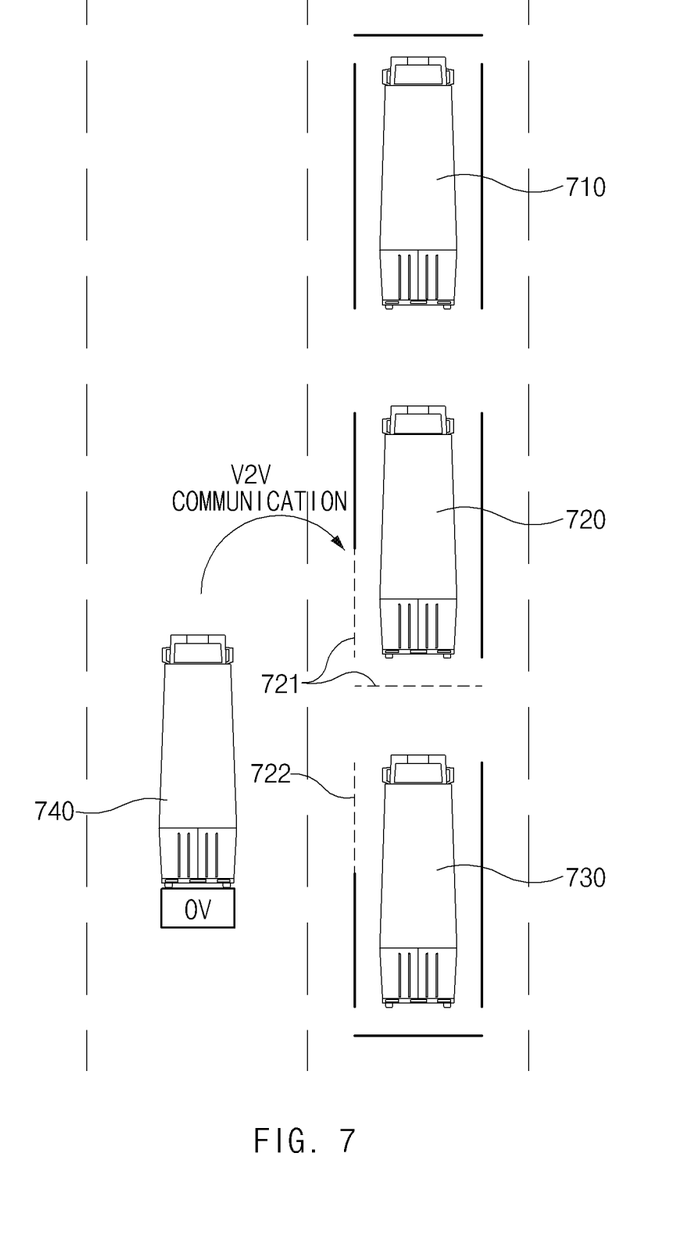
FIG. 7 is a drawing illustrating an exemplary operation of an apparatus for outputting platooning information by a vehicle according to embodiments of the present disclosure.

FIG. 7 is a drawing illustrating an exemplary operation of an apparatus for outputting platooning information by a vehicle according to embodiments of the present disclosure.

As shown in FIG. 7, each of a first vehicle 710, a second vehicle 720, and a third vehicle 730 according to embodiments may display symbols which surround a platooning group on a road using its lamp. The first vehicle 710, the second vehicle 720, and the third vehicle 730 may form one platooning group. An outside vehicle 740 may notify the second vehicle 720 of an intention to enter between vehicles included in the platooning group, through vehicle-to-vehicle (V2V) communication.

To permit the outside vehicle 740 to cut-in, the second vehicle 720 and the third vehicle 730 may control their speeds to increase a distance between the second vehicle 720 and the third vehicle 730. In this case, the second vehicle 720 and the third vehicle 730 may display symbols 721 and 722 on the road to notify the outside vehicle 740 that it is permitted to cut-in. The second vehicle 720 may change colors and/or shapes of the symbols 721 of portions close to the outside vehicle 740. Furthermore, the third vehicle 730 may change a color and/or shape of the symbol 722 of a portion close to the outside vehicle 740. As a result, a driver of the outside vehicle 740 may determine that the second vehicle 720 and the third vehicle 730 are controlled to permit the outside vehicle 740 to enter and may safely enter between the second vehicle 720 and the third vehicle 730.

Figure 8:
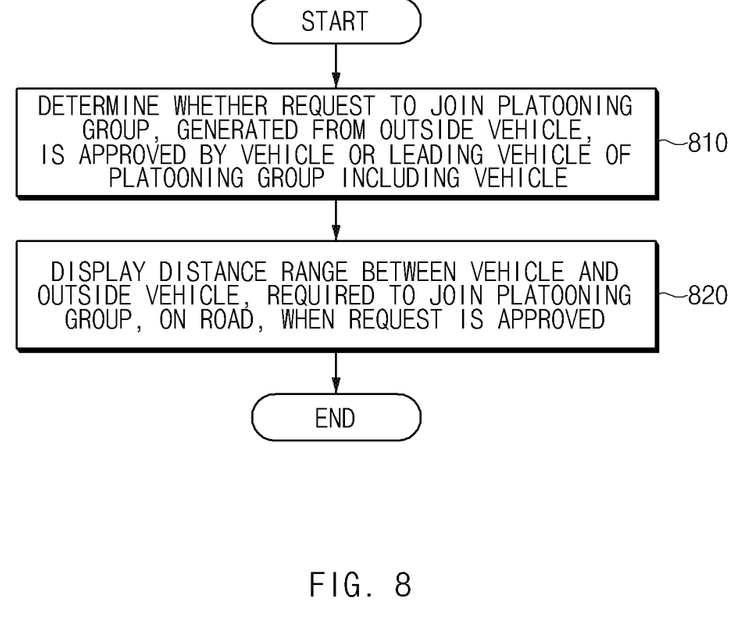
FIG. 8 is a flowchart illustrating a method for outputting platooning information by a vehicle according to embodiments of the present disclosure.

FIG. 8 is a flowchart illustrating a method for outputting platooning information by a vehicle according to embodiments of the present disclosure.

Hereinafter, it is assumed that a vehicle including an apparatus 100 for outputting platooning information in FIG. 1 performs a process of FIG. 8. Furthermore, in a description of FIG. 8, an operation described as being performed by the vehicle may be understood as being controlled by a control circuit 150 of the apparatus 100 for outputting the platooning information.

As shown in FIG. 8, in operation 810, the vehicle may determine whether a request to join a platooning group, generated from an outside vehicle, is approved by the vehicle or a leading vehicle of the platooning group including the vehicle. For example, a driver of the outside vehicle may transmit the joining request to the platooning group including the vehicle. The vehicle may determine whether to approve the joining request of the outside vehicle. In operation 820, when the joining request is approved, the vehicle may display a distance range between the vehicle and the outside vehicle, required to join the platooning group, on a road. For example, the vehicle may output a symbol indicating the required approaching distance on the road using its lamp. Furthermore, the vehicle may output various symbols described with reference to FIGS. 3 to 7.

Figure 9:
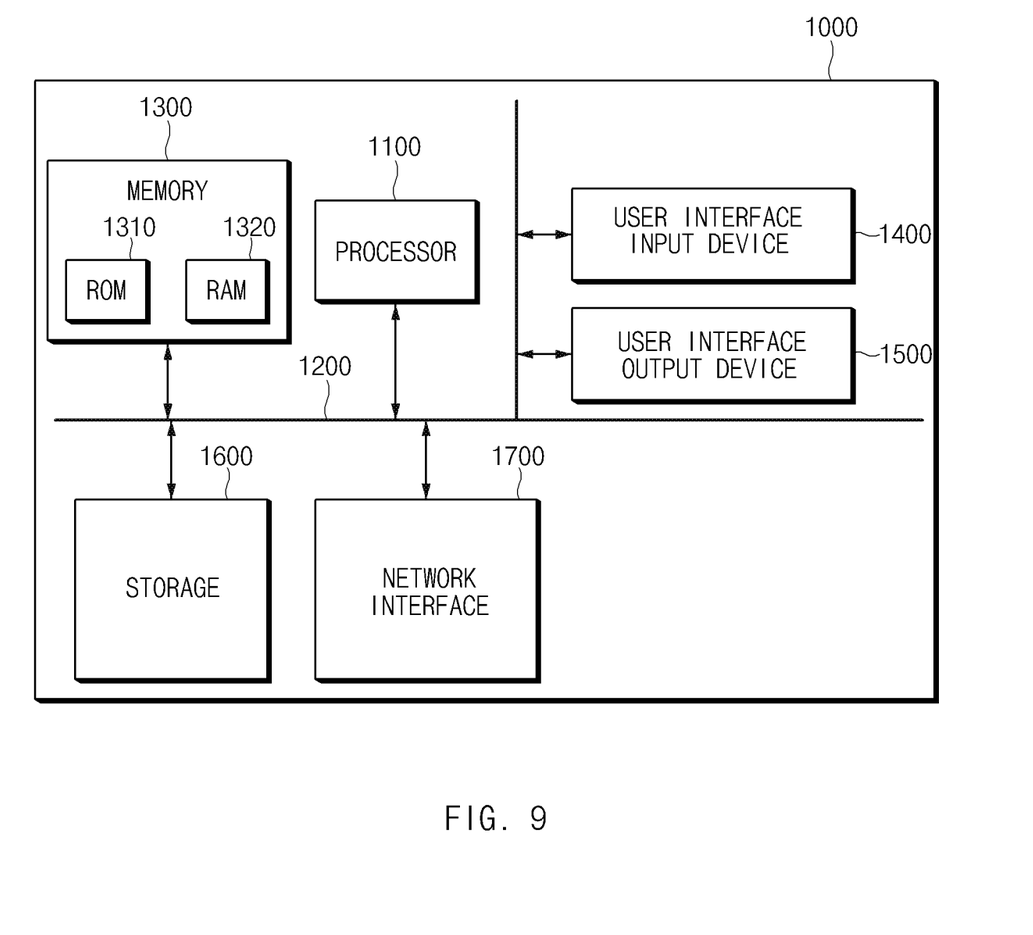
FIG. 9 is a block diagram illustrating a configuration of a computing system according to embodiments of the present disclosure.

FIG. 9 is a block diagram illustrating a configuration of a computing system according to embodiments of the present disclosure.

As shown in FIG. 9, the above-mentioned method according to embodiments of the present disclosure may be implemented by means of the computing system. The computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

Embodiments of the present disclosure may display a variety of information on a road using a lamp installed on a platooning vehicle to intuitively provide information associated with platooning to a driver of the platooning vehicle and a driver of an outside vehicle.

In addition, various effects directly or indirectly ascertained through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An apparatus for outputting platooning information in a vehicle, the apparatus comprising:
   one or more lamps configured to project light onto a road;
   a communication circuit configured to communicate with the outside;
   a controller configured to control a behavior of the vehicle for platooning; and
   a control circuit electrically connected with the one or more lamps, the communication circuit, and the controller,
   wherein the control circuit is configured to:
      output indications which surround a platooning group including the vehicle to identify the platooning group on the road using the one or more lamps;
      output indications which surround the front and sides of the vehicle, if the vehicle is the leading vehicle of the platooning group;
      output indications which surround the rear and sides of the vehicle, if the vehicle is a tail end vehicle of the platooning group; and
      output indications which surround the sides of the vehicle, if the vehicle is located in the middle of the platooning group, and
   wherein the control circuit is configured to adjust brightness of the one or more lamps based on a distance between vehicles included in the platooning group.

2. The apparatus of claim 1, wherein the control circuit is configured to:
   output indications which surround the vehicle to identify the leading vehicle using the one or more lamps on the road, if the vehicle is the leading vehicle of the platooning group.

3. The apparatus of claim 2, wherein the control circuit is configured to:
   output indications which surround the vehicle on the road in a color different from a color of an indication output from another vehicle included in the platooning group.

4. The apparatus of claim 1, further comprising:
   a sensor configured to sense illumination intensity,
   wherein the control circuit is configured to:
   adjust brightness of the one or more lamps based on external illumination intensity sensed by the sensor.

5. The apparatus of claim 1, wherein the control circuit is configured to:
   receive a request to cut-in in front of or behind the vehicle from another outside vehicle using the communication circuit; and
   output an indication for guiding the other outside vehicle to cut-in on the road.

6. A method for outputting platooning information in a vehicle, the method comprising:
   outputting indications which surround a platooning group including the vehicle to identify the platooning group on the road; and
   adjusting brightness of the indications based on a distance between vehicles included in the platooning group.

7. The method of claim 6, further comprising:
   outputting indications which surround the vehicle to identify the leading vehicle on the road, if the vehicle is the leading vehicle of the platooning group.

8. The method of claim 6, further comprising:
   receiving a request to cut-in in front of or behind the vehicle from another outside vehicle; and
   outputting an indication for guiding the other outside vehicle to cut-in on the road.

* * * * *